Uberto Capra
INVENTOR.

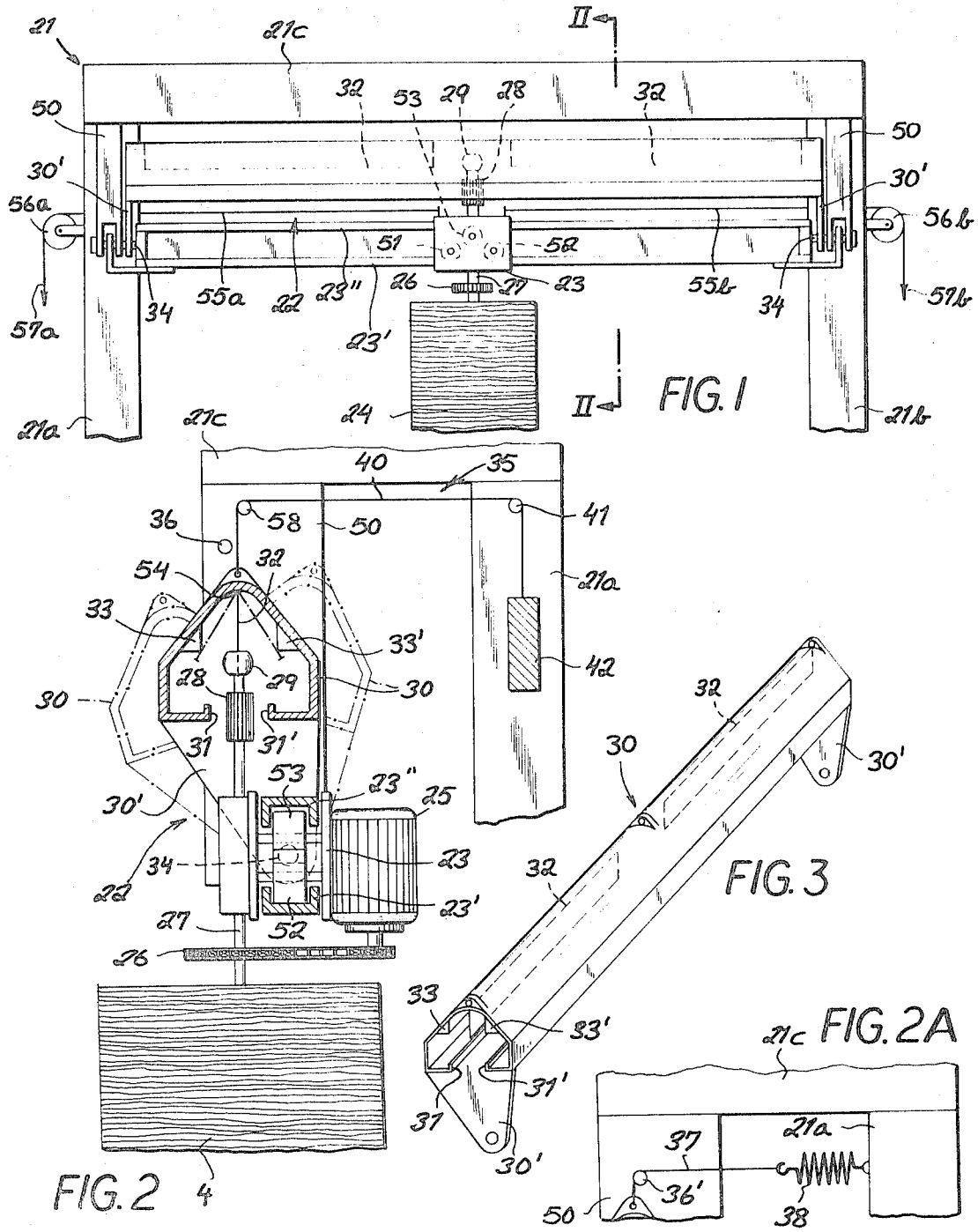

BY Karl J. Ross
Attorney

United States Patent Office 3,618,152
Patented Nov. 9, 1971

3,618,152
DRIVING MECHANISM FOR SCRUBBING
BRUSHES OF VEHICLE-WASHING STATIONS
Uberto Capra, Vicenza, Italy, assignor to Ceccato & C.
S.p.A., Vicenza, Italy
Continuation-in-part of applications Ser. No. 814,261, Apr.
8, 1969, and Ser. No. 874,355, Nov. 5, 1969. This application June 29, 1970, Ser. No. 50,751
Claims priority, application Italy, June 28, 1969,
18,880/69
Int. Cl. B60s 3/06
U.S. Cl. 15—21 E                                    6 Claims

ABSTRACT OF THE DISCLOSURE

The shaft of a scrubbing brush suspended from a carriage displaceable across or alongside the path of a vehicle to be scrubbed, journaled in a pivotally mounted housing so as to swing in a plane transverse to the direction of carriage motion, is coupled by way of a speed-reversing transmission with a knurled roller mounted on another shaft journaled in the same housing, this roller co-operating with a friction surface parallel to the carriage track to move the carriage in a predetermined direction on being urged against that surface by a thrust exerted upon the brush as it contacts the vehicle. Owing to the interposition of the speed-reversing transmission, the carriage motion is codirectional with the peripheral motion at its point of contact with the vehicular surface to be scrubbed, with resultant intensification of the cleaning action.

This application is a continuation-in-part of my copending applications Ser. Nos. 814,261, filed Apr. 8, 1969, and now abandoned, and 874,355, filed Nov. 5, 1969.

My present invention relates to an apparatus for the scrubbing of vehicular surfaces as used in a washing station for automotive vehicles.

In such washing stations it is customary to provide a portal frame whose upright or jambs straddle the path of a vehicle to be washed while its lintel extends transversely above this vehicle, the frame of the vehicle being relatively movable in a longitudinal direction (i.e. at right angles to the lintel) during a scrubbing operation. For this purpose, the frame jambs may be mounted on rail-supported rollers or the vehicle may be slowly driven or towed through the frame.

In my prior Pat. No. 3,500,487 I have disclosed a frame of this general type on which a rotary scrubbing brush is suspended from a carriage slidably guided along a horizontal track for displacement in one direction or the other under the control of weights connected to the carriage via flexible cables. The weights move in respective wells which can be alternately filled with water and drained so that the carriage is pulled toward the right or the left as seen from the driver's seat.

As noted in my copending applications identified above, it is frequently desirable to arrange the pull of these weights in such a way that the carriage and its brush or brushes will always be urged toward the center of the frame, thereby exerting the necessary pressure upon the lateral surfaces of the vehicle when the brush moves along these surfaces. When scrubbing either the front end or the rear end of the vehicle, the brush will be advanced by this pull until it reaches the centerline whereupon a supplemental force must be provided to complete the sweep against the biasing effect of the weights.

Such a supplemental force can be generated, in accordance with the teachings of my aforementioned prior applications, by a tiltable mounting of the brush support to enable a swing of the brush shaft in a plane transverse to the guide track. Such a swing, brought about by a thrust exerted upon the brush as it contacts a vehicular surface, places a traction roller at the top of the shaft in a position of engagement with a friction surface extending parallel to the track whereby the rotation of the driven shaft is translated into a longitudinal displacement of the carriage. By the provision of two confronting friction surfaces on opposite sides of the traction rollers, the direction of carriage motion can be reversed with continuous rotation as the brush is thrust forwardly on scrubbing the front or rearwardly on scrubbing the back of the vehicle. At points where this supplemental force is not needed, as when the brush advances toward the centerline, or where a displacement of the carriage along the track would be undesirable, as during the scrubbing of the sides of the vehicle, the traction roller is blocked from contact with the corresponding friction surface by the interposition of a deflector, mounted on the frame, between one of two abutments paralleling the friction surfaces and an idler roller on the brush shaft.

Owing to the manner in which the shaft is tiltable about a horizontal axis generally in line with the guide track, thus lying at a level between the brush and the traction roller, an outward swing of the brush causes an inward swing of the roller which therefore engages the friction surface proximal to the vehicle. With the roller rotating in the same sense as the brush, the peripheral speed of the brush relative to the engaged vehicular surface theoretically corresponds to the angular velocity of the shaft times the difference between the radii of the brush and the traction roller; in reality, this relative speed may be still lower as the brush tends to accelerate the motion of the carriage. For effective scrubbing action, therefore, the diameter of the brush must be large compared with that of the roller.

The object of my present invention is to provide an improved system of this type wherein, for a given ratio of brush and roller diameters, scrubbing efficiency is enhanced through an increase of the relative peripheral speed of a brush driven with a predetermined angular velocity.

This object is realized, pursuant to my present invention, by a mounting of the track roller on a second shaft journaled in the same tiltable carriage as the brush shaft and coupled with the latter shaft, for joint rotation, through a transmission such as a pair of meshing gears which causes the entrainment of the carriage to be co-directional with the peripheral motion of the brush at its point of contact with a vehicular surface, in contradistinction to my prior system wherein the engagement of the traction roller with the friction surface entrains the carriage in a direction opposite that of the peripheral brush motion at the contact point.

Such a system is useful not only for the scrubbing of the front and rear ends of a vehicle but also for sweeping its lateral surfaces with the aid of a brush-supporting carriage whose guide track parallels the centerline of the vehicle. Thus, the two sides of the vehicle can be swept simultaneously by two brushes, or sets of brushes, respectively bearing upon these sides and thrust outwardly by contact therewith so that the rotary motion imparted to the brush shafts propels the respective carriages either forwardly or rearwardly, depending on the direction of rotation.

These and other features of my invention will be described in detail hereinafter with reference to the accompanying drawing in which:

FIG. 1 is a front-elevational view of the upper part of an otherwise conventional portal frame equipped with a brush-supporting carriage of the type disclosed in my application Ser. No. 874,355;

FIG. 2 is a cross-sectional view taken on the line II—II of FIG. 1;

FIG. 2a is a fragmentary view similar to the upper part of FIG. 2 showing a modification;

FIG. 3 is a perspective view of a swingable guide structure forming part of the assembly of FIGS. 1 and 2;

FIG. 2 but showing a brush mounting embodying the present improvement; and

Figure 6:
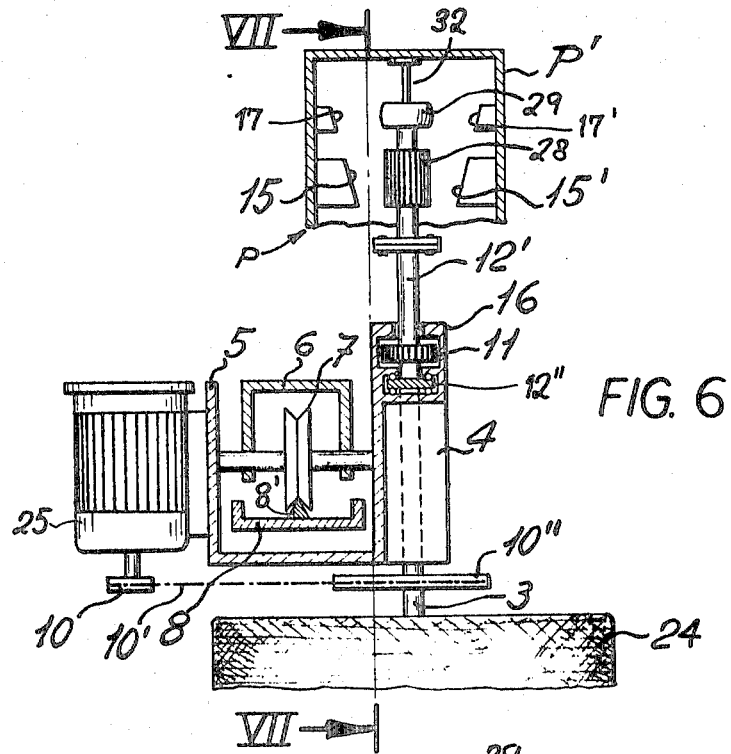
Figure 7:
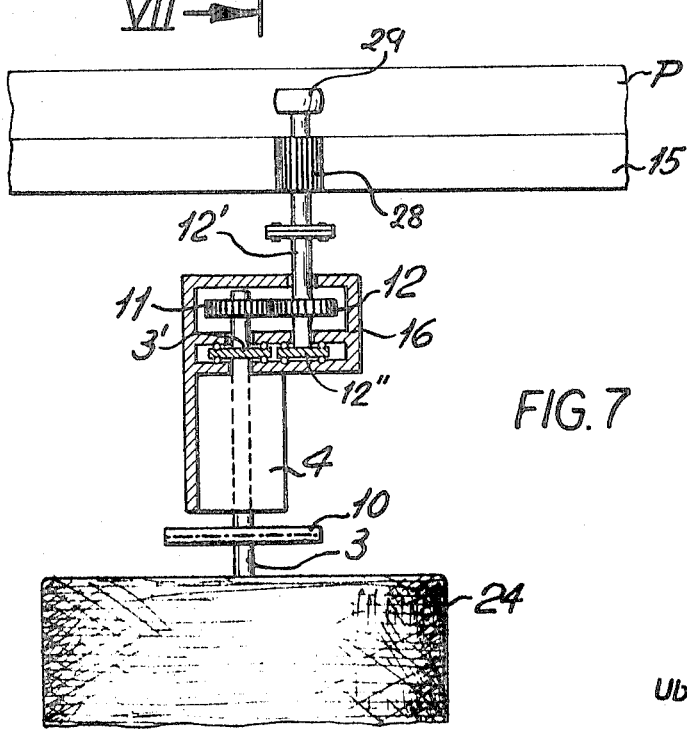

FIG. 7 is a transverse sectional view taken on the line VII—VII of FIG. 6.

In FIGS. 1-3 I have shown part of a portal frame 21 having jambs 21a, 21b and a lintel 21c, this frame being of such side as to span an automotive vehicle in a washing station. Just below the lintel 21c the frame carries an assembly 22 for the guidance of a transversely reciprocable carriage 23, this assembly including a structure 30 of inverted-trough shape with a pair of cheek plates 30' which are pivoted at 34 to a pair of arms 50 depending from an overhanging portion of lintel 21c. Pivot pins 34 oscillatably support a guide rail constituted by a pair of confronting channel members 23', 23" embracing a group of rollers 51, 52, 53 on carriage 23; rollers 51 and 52 rest on the lower channel member 23' whereas roller 53 is slightly spaced from the upper member 23" to engage it upon an excessive lateral swing (in the plane of the frame 21) of a shaft 27 rotatably journaled in carriage 23. Shaft 27 is driven, via a belt or chain transmission 26, from an electric motor 25 secured to the carriage and energized through a flexible cable not shown; the lower end of this shaft supports a scrubbing brush 24 of generally cylindrical configuration. The top of shaft 27 carries a knurled traction roller 28 rigid with the shaft and an idler roller 29 freely rotatable thereon. A pair of inturned edges 31 and 31' of structure 30, extending over the full length of that structure, confront each other on opposite sides of roller 28 and form friction surfaces alternately engageable therewith when the shaft 27 and its brush 24 swing from their illustrated vertical position in one direction or the other.

A pair of deflecting plates 32 are hingedly mounted at the zenith of structure 30 so as to be swingable about a horizontal axis 54 into either of two limiting positions illustrated in dot-dash lines in FIG. 2. In such a limiting position the deflecting plates 32 rest against one of two longitudinally extending abutments 33, 33' on either side of idler roller 29; upon movement of shaft 27 to the left or the right of its center position illustrated in FIG. 1, with the brush 24 thrust out of the plane of frame 21 so that traction roller 28 engages one of the two co-operating friction surfaces 31, 31", its idler roller 29 comes to lie either forwardly or rearwardly of a deflector 32 (as seen in the direction of vehicle motion) so that a reverse swing of the brush will be stopped by contact between idler roller 29 and deflector 32 before the traction roller 28 can engage the opposite friction surface, the deflector then coming to rest against one of the two abutments 33, 33'. With a vehicle V (FIG. 4) approaching the frame 21 (or vice versa) in the forward direction, i.e. so that its front end comes into contact with the brush 24, this brush is deflected forwardly whereby the shaft 27 tilts about the pivotable axis of pins 34 in a clockwise sense as viewed in FIG. 2. Roller 28 thereupon engages the rear edge 31' of guide structure 30 so that the carirage 23 will move along the rail 23', 23" in a direction depending on the sense of rotation of shaft 27.

Carriage 23 is biased into its illustrated central position by a pair of wires 55a, 55b passing around deflecting rollers 56a, 56b on frame 21, these wires being anchored to respective weights as diagrammatically represented by arrowheads 57a, 57b. If the brush is to scrub first the left side of the vehicle, weight 57b is rendered effective (as by immersing the weight 57a in water in the manner disclosed in my prior Pat. No. 3,500,487) so that a pull to the right (as viewed in FIG. 1) is exerted upon the carriage; against this pull the carriage is displaced to the left by a counterclockwise rotation of its traction roller 28 as viewed from above. When the brush moves off the left-hand front end of the vehicle, gravity tends to restore the shaft 27 to its normal vertical position; as the brush continues its counterclockwise rotation, however, its frictional engagement with the left vehicle surface (against which it is urged by the rightward pull of wire 55b) tends to swing the brush rearwardly so that roller 28 is moved toward the forward friction surface 31. Owing to the interposition of deflector 32, however, the roller 28 is kept out of contact with that surface and does not cause an untimely return movement of the carriage. When, next, the brush clears the side of the vehicle, the pull of wire 55b draws the carriage back toward the center of the frame; this coincides with a reversal of the relative motion of frame 21 and vehicle V so that the brush 24 is held in its rearwardly deflected position, with roller 29 still engaging the deflector 32 so that no traction is exerted upon the carriage through roller 28. As the carriage returns to its midposition, roller 29 reaches a clearance between the two deflectors 32 (which could also be combined into a single deflecting strip) so that roller 28 is now free to co-operate with forward edge 31 in driving the carriage further to the right against the reverse pull of the weights which now biases it in a leftward direction. The scrubbing of the right side of the vehicle and of the remaining half of its rear and front ends then proceeds in a manner analogous to that described above.

The alternate tilting of shaft 27 to engage either of the friction surfaces 31, 31', or to come to rest against an interposed deflector 32, does not require any rocking of the guide structure 30 from its normal position illustrated in full lines in FIG. 2. Under certain conditions, however, e.g. when the brush 24 encounters a sharp projection on the front or rear surface of the vehicle, the swing of the shaft must be increased. In such a situation the entire structure 30 swings about the pivotal axis of pins 34 against a restoring force which in FIG. 2 is represented by a weight 42 attached to a cable 40 passing around deflecting rods 41, 58 on the frame; cable 40 is anchored to the top of structure 30 so as to stabilize its position with the aid of a further deflector rod 36 opposing a counterclockwise swing as viewed in FIG. 2. In lieu of or in addition to a restoring force provided by a weight 42, such a restoring force may also be supplied by a spring 38 anchored to the jamb 21a or 21b and to a cable 37' passing around a deflecting rod 16' as shown in FIG. 2a; it will be understood that several such weights and/or springs may be disposed along the lintel 21c for jointly stabilizing the structure 30. Two opposite swung-out positions of that structure have been illustrated in dot-dash lines in FIG. 2.

Figure 4:
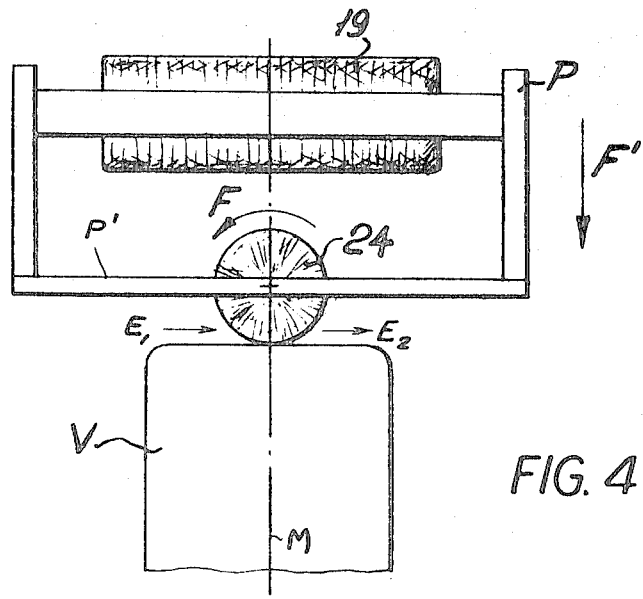
FIG. 4 is a somewhat diagrammatic plan view illustrating the displacement of a brush, similar to that of FIGS. 1 and 2, on its support in accordance with my present improvement.

In FIG. 4 a portal frame P, generally similar to the frame 21 of the preceding embodiment, has an outrigger portion P' resembling the structure 10 of FIGS. 1-3. Brush 24, suspended from the frame structure P' in a manner more fully described hereinafter with reference to FIGS. 6 and 7, happens to lie along the centerline of a vehicle V whose motion relative to the frame P has been indicated by an arrow F'. For convenience, the vehicular surface engaged by the brush 24 will be considered the front end of the vehicle.

With the vehicle of the frame temporarily arrested and with brush 24 rotating counterclockwise as indicated by an arrow F, the carriage supporting the brush is constrained to move from left to right. The first half of the brush sweep, represented by an arrow $E_1$, may be performed simply by the pull of a weight as described above, with deactivation of the frictional propulsion mechanism by interposition of a blocking element such as the deflector 32 of FIGS. 1–3; the second half of the sweep, represented by an arrow $E_2$, again occurs against the force of gravity in response to frictional engagement of a traction roller with a coacting surface. It will be noted that the direction of arrows $E_1$ and $E_2$ corresponds to that of the peripheral motion of the brush at its point of contact with vehicle V; the peripheral velocity of the brush relative to the vehicular surface thus represents the sum of its absolute peripheral velocity and the linear speed of the brush carriage.

A second, horizontal brush 19 on frame P may sweep the top of the vehicle V as the frame thereafter resumes its motion in the direction F' (or the vehicle advances in the opposite direction), brush 19 being suspended for this purpose with freedom of vertical displacement as is well known per se. During such relation motion of frame P and vehicle V, the brush 24 may scrub the right side of the vehicle; next, after stoppage of this relative motion, the same brush may be shifted to the left to scrub the back of the car, this being followed by a sweep of the left side as the relative motion of frame and vehicle is restarted in the reverse direction. During this entire operation the brush 24 may rotate continuously in the same sense, i.e. counterclockwise.

Figure 5:
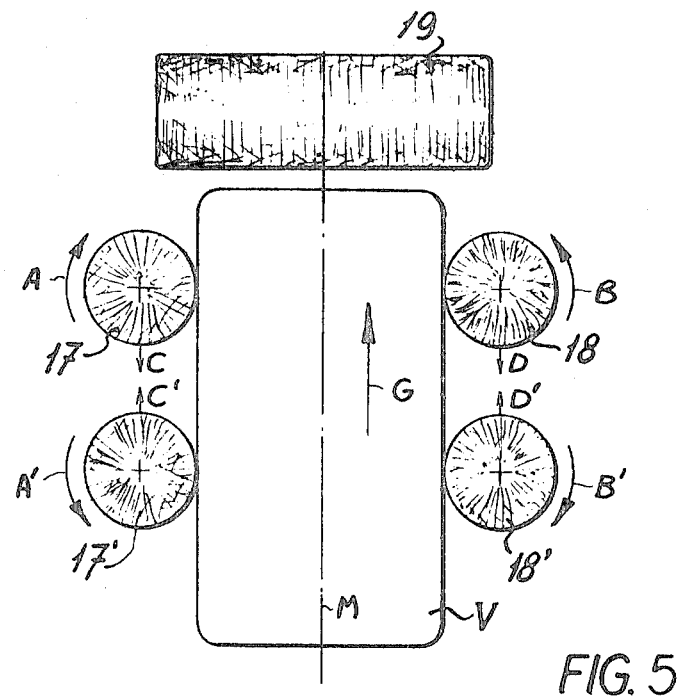
FIG. 5 is a similar diagrammatic plan view of a modification brush assembly.

FIG. 5 shows a modified arrangement with four vertical brushes 17, 17' and 18, 18' bearing upon opposite sides of vehicle V. The brushes of each pair are shown rotating in opposite directions, i.e. clockwise (arrows A and B') in the case of brushes 17, 18' and counterclockwise (arrows A' and B) in the case of brushes 17' 18. Brush 17, after sweeping the left front of the vehicle starting at centerline M, scrubs half the left side as indicated by an arrow C; brush 18 performs a similar operation along the right front and half of the right side of the vehicle as indicated by an arrow D. Brushes 17' and 18' serve the left and right halves of the rear surface, respectively, and adjacent portions of the corresponding sides along which they move in the direction of arrows C' and D'. When the vehicle resumes its motion as indicated by an arrow G, brush 19 cleans the top surface.

FIGS. 6 and 7 show details of the mounting of brush 24 of FIG. 4, this arrangement being also applicable to the individual mountings of the brushes of FIG. 5. Brush 24 is shown to have a shaft 3 journaled in an extension 4 of a bracket 5 forming part of a carriage 6 on which a guide roller 7 (representative of several such rollers, such as those shown at 51 and 52 in FIG. 1) is journaled to ride on a ridge 8' of a track 8 which may here be rigid with the portal frame P. Roller 7, which is of the grooved type, may limitedly tilt on ridge 8' whenever the shaft 3 is deflected from its vertical position as the brush 24 contacts a vehicular surface. Drive motor 25 has a pulley 10 linked through a belt 10' with a sheave 10" on shaft 3. The weight of this motor substantially balances that of the brush and its mounting, with the center of gravity of the assembly well below the level of track 8.

A second shaft 12', parallel to shaft 3, carries rollers 28 and 29 co-operating with friction surfaces 15, 15' and abutment surfaces 17, 17' which correspond to elements 31, 31' and 33, 33' of FIGS. 2 and 3. Conventional means including thrust bearings 3' and 12" hold the two shafts against axial displacement relative to carriage 6. Meshing gears 11 and 12 on shafts 3 and 12" couple the two shafts for reverse rotation whereby traction roller 28 will turn counter to brush 24 whenever the shaft 3 is driven by the motor 25. Naturally, the motor could also be coupled with shaft 12' without changing the mode of operation of the system. The speed-reversing transmission 11, 12 insures a direction of carriage displacement such that the relative peripheral speed of the brush, at least in theory, corresponds to the angular velocity of the shaft 3 times the sum of the radii of the brush and the traction roller 28.

When the brush moves along the side of a vehicle, its direction of rotation no longer tends to reverse the tilt of its shaft in the manner described with reference to FIGS. 1–3 so that there is less need for the interposition of a deflector 32 to prevent the engagement of the traction roller with the opposite friction surface; in some cases, therefore, the abutments 17 and 17' as well as the idler roller 29 may be omitted.

The friction surfaces 15, 15' or 31, 31' could also be corrugated or knurled, like the traction roller 28 co-operating therewith, or otherwise roughened to afford a more positive interengagement.

Naturally, the track-guided carriage 6 or 23 could also be extended to support two or more brushes driven by the same motor.

I claim:
1. An apparatus for scrubbing vehicular surfaces, comprising:
   a support forming a horizontal guide track;
   a carriage mounted on said guide track for reciprocation along a vehicular surface to be scrubbed, said carriage being swingable about an axis substantially in line with said guide track;
   a first shaft transverse to said guide tracks rotatably journaled in said carriage;
   a brush mounted on said first shaft for rotation therewith in contact with said vehicular surface, such contact deflecting said brush and said carriage from a normal position into a swung-out position;
   a second shaft transverse to said guide track rotatably journaled in said carriage;
   a traction roller on said second shaft, said support being provided with a friction surface extending along said guide track for engagement by said traction roller in said swung-out position;
   drive means coupled with one of said shafts for imparting rotation thereto;
   and transmission means interconnecting said shafts for joint rotation in a sense causing an entrainment of said carriage codirectional with the peripheral motion of said brush at its point of contact with said vehicular surface upon engagement of said friction surface by said traction roller.

2. An apparatus as defined in claim 1 wherein said drive means is reversible.

3. An apparatus as defined in claim 1 wherein said support is provided with another friction surface confronting the first-mentioned friction surface with said traction roller interposed therebetween for alternate engagement therewith in opposite swung-out positions.

4. An apparatus as defined in claim 3, further comprising blocking means on said support for preventing engagement of said traction roller with either of said friction surfaces in certain positions of said carriage.

5. An apparatus as defined in claim 1 wherein said shafts are generally vertical, said axis being horizontal, said brush being mounted at the lower end of said first shaft below said axis, said traction roller being mounted on the upper end of said second shaft above said axis.

6. An apparatus as defined in claim 1 wherein said transmission means comprises a pair of meshing gears on said shafts.

References Cited

UNITED STATES PATENTS

| 3,451,085 | 6/1969 | Hay | 15—21 D |
| 3,500,487 | 3/1970 | Capra | 15—21 E |

FOREIGN PATENTS

| 1,457,311 | 9/1966 | France | 15—DIG. 2 |

EDWARD L. ROBERTS, Primary Examiner